(12) United States Patent
Ryskamp

(10) Patent No.: US 10,817,784 B2
(45) Date of Patent: Oct. 27, 2020

(54) SYSTEMS AND METHODS FOR MACHINE LEARNING USING A NETWORK OF DECISION-MAKING NODES

(71) Applicant: Ryskamp Innovations, LLC, Mapleton, UT (US)

(72) Inventor: Rix Ryskamp, Mapleton, UT (US)

(73) Assignee: Ryskamp Innovations, LLC, Mapleton, UT (US)

( * ) Notice: Subject to any disclaimer, the term of this patent is extended or adjusted under 35 U.S.C. 154(b) by 1041 days.

(21) Appl. No.: 15/247,649

(22) Filed: Aug. 25, 2016

(65) Prior Publication Data

US 2017/0061282 A1   Mar. 2, 2017

Related U.S. Application Data

(60) Provisional application No. 62/209,799, filed on Aug. 25, 2015.

(51) Int. Cl.
*G06N 3/08* (2006.01)
*G06N 20/00* (2019.01)
*G06N 3/04* (2006.01)

(52) U.S. Cl.
CPC .......... *G06N 3/088* (2013.01); *G06N 3/0427* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,444,796 A * | 8/1995 | Ornstein | G06K 9/6267 382/157 |
| 7,379,926 B1 | 5/2008 | Belniak et al. | |
| 2014/0081895 A1 * | 3/2014 | Coenen | G05B 13/027 706/25 |
| 2014/0337255 A1 | 11/2014 | Eads | |
| 2017/0228638 A1 | 8/2017 | Danihelka et al. | |

FOREIGN PATENT DOCUMENTS

JP   H0535709   2/1993

\* cited by examiner

*Primary Examiner* — Daniel T Pellett
(74) *Attorney, Agent, or Firm* — Kory D. Christensen

(57) ABSTRACT

System and methods for machine learning are described. A first input value is obtained. A second input value is also obtained. A decision to use for generating a cycle output is selected based on a randomness factor. The decision is at least one of a random decision or a best decision from a previous cycle. A cycle output for the first and second inputs is generated using the selected decision. The selected decision and the resulting cycle output are stored.

21 Claims, 11 Drawing Sheets

| | Input 1 Value: INT(3) 105A-1 | Input 1 Value: INT(4) 105A-2 | Input 1 Value: INT(5) 105A-3 | Input 1 Value: INT(6) 105A-4 |
|---|---|---|---|---|
| Input 2 Value: INT(9) 105B-1 | Neuron 305 | Neuron 305 | Neuron 305 | Neuron 305 |
| Input 2 Value: INT(10) 105B-2 | Neuron 305 | Neuron 305 | Neuron 305 | Neuron 305 |
| Input 2 Value: INT(11) 105B-3 | Neuron 305 | Neuron 305 | Neuron 305 | Neuron 305 |
| Input 2 Value: INT(12) 105B-4 | Neuron 305 | Neuron 305 | Neuron 305 | Neuron 305 |

Neuron Selected for Input 1 = INT(4) and Input 2 = INT(12) with 1% linear bracketing

SYSTEMS AND METHODS FOR MACHINE LEARNING USING A NETWORK OF DECISION-MAKING NODES

RELATED APPLICATION

This application claims the benefit under 35 U.S.C. § 119(e) of U.S. Provisional Application No. 62/209,799 filed Aug. 25, 2015, which is incorporated by reference herein in its entirety.

TECHNICAL FIELD

The present disclosure relates to artificial intelligence and/or machine learning. That is, the ability for a computing device to learn based on feedback or predetermined ideal results rather than through explicit programming. Traditional approaches to artificial intelligence and/or machine learning rely on random convergence of a series of weights. Such approaches require large amounts of computational resources (e.g., processing power) and/or time resources, often both. Accordingly, systems and methods are needed for improving artificial intelligence and/or machine learning.

BRIEF DESCRIPTION OF THE DRAWINGS

FIG. 7 is a block diagram illustrating another example of a network of decision making neurons that are each associated with a unique input value combination and some of the input value combinations are linear while others are distinct.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Machine learning is a known discipline in the art of computer science, as is neural networking, which is a type of machine learning. Machine learning systems may be used to solve problems or find patterns faster or with more accuracy than they could be solved by using other technologies or systems.

The present systems and methods describe various techniques for machine learning. That is, the process of how a machine learns based on its own experiences (i.e., without explicit programming). As used herein, learning encompasses many specific learning applications including, for example, recognition (e.g., pattern, speech, object, etc.) and problem solving (e.g., solving a maze, playing a game, determining possible outcomes, predicting best outcomes, limit detection, etc.).

Figure 1:
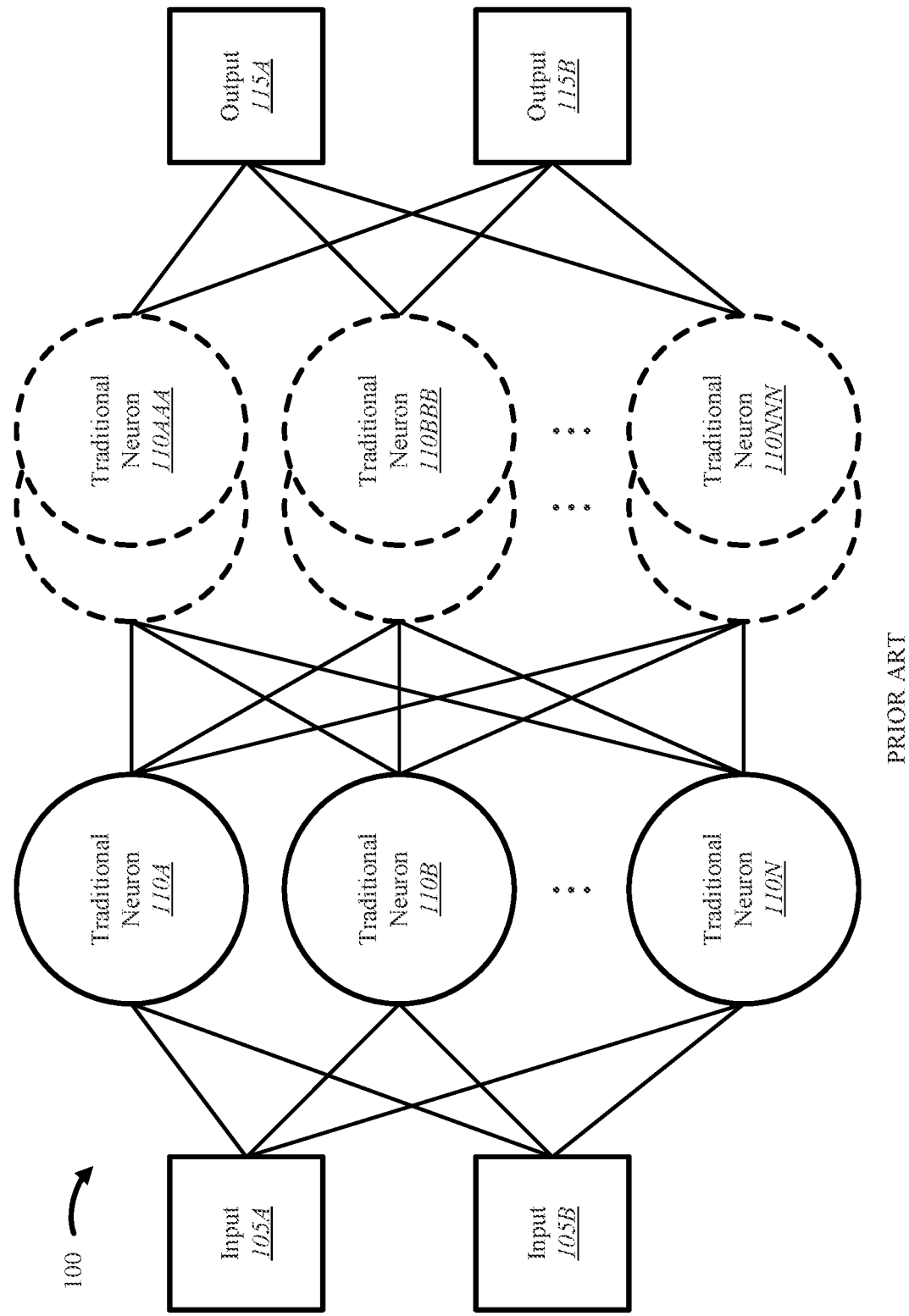
FIG. 1 is a block diagram illustrating one example of a traditional neural network.

FIG. 1 is a block diagram illustrating one example of a traditional neural network 100. As illustrated, a traditional neural network 100 includes one or more inputs 105 (e.g., inputs 105A and 105B) and one or more outputs 115 (e.g., 115A and 115B) separated by one or more neuron layers 110 (e.g., neuron layer 110A-N) which optionally include one or more hidden layers (e.g., neuron layer 110AA-NN (not labeled) and neuron layer 110AAA-NNN).

Each neuron layer includes a large number of traditional neurons 110 (e.g., 110A-110N). Although the traditional neural network 100 is illustrated as having N traditional neurons in each layer, it is understood that different neuron layers may have different numbers of traditional neurons 110.

Figure 2:
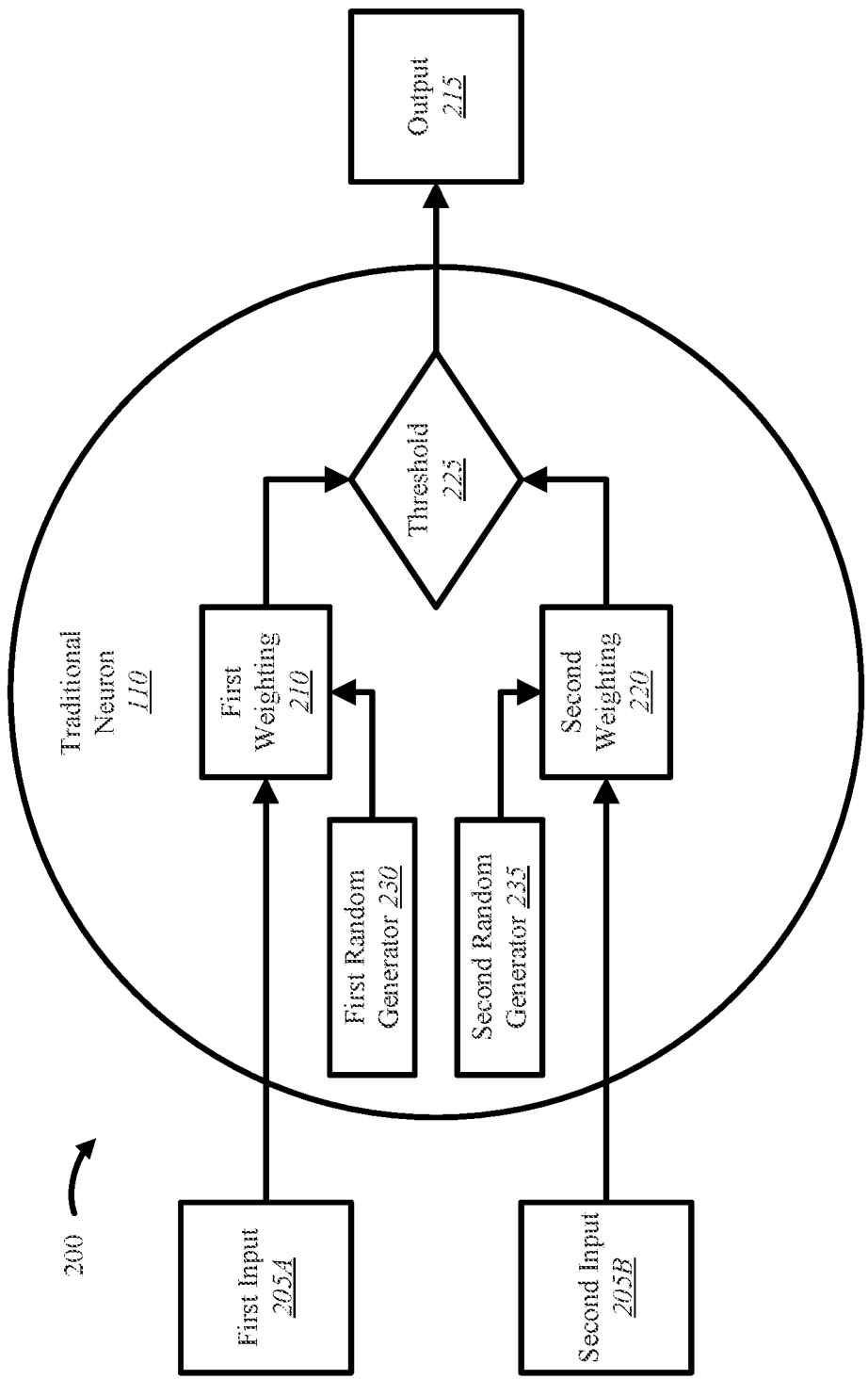
FIG. 2 is a block diagram illustrating one example of a traditional neuron.

FIG. 2 is a block diagram illustrating one example 200 of a traditional neuron 110. As illustrated, the traditional neuron 110 includes a first weighting 210 that weights a first input 205A based on a first random generator 230 (e.g., random number generator) and a second weighting 220 that weights a second input 205B based on an (unrelated) second random generator 235. The weighted first input and weighted second input are input to a threshold 225 that generates output 215 based on some threshold of the weighted inputs. In other words, the output 215 of each traditional neuron 110 is determined as follows: input values (e.g., inputs 205A and 205B) are received, these values are altered according to the stored weights (e.g., weightings 210, 220) associated with them, and the combination of all inputs after being passed through weights go to the threshold 225, which may be a mathematical equation or any other means of aggregating the total values of the inputs 105 combined with their weightings 210, 220 to achieve an output 215.

For example, if the first input 205A has a value of 1.0 and the second input 205B has a value of 2.0, the weight 210 for the first input 205A has a value of −1.0 and the weight for the second input 205B has a value of 1.0, the post-weighted value for the first input 205A will be "−1.0" (1.0*−1.0=−1.0) and the post-weighted value for the second input 205B will be "2.0" (2.0*1.0=2.0). In this example, the threshold 225 simply sends out positive numbers and changes negative numbers to zero. So in this example, the output 215 would be the average of the post-weighted values −1.0 and 2.0 above and since this average of 0.5 is above the threshold of 0, an output value of 0.5 is sent to the output 215.

Thus, traditional neural networks 100 use a system of weights 210, 220 assigned to each of the traditional neuron's 110 incoming links from inputs 105 or other neurons 110 to generate an output 215. The traditional neuron's 110 resulting output signal 215 is sent to network outputs 115 (e.g., 115A, 115B) or other neurons 110 (as illustrated). The traditional neural network 100 attempts to learn by adjusting weights. These weights are adjusted either randomly or based upon feedback provided by the user or an external process. The traditional neural network 100 identifies patterns (e.g., learns) as outputs 115 converge. That is, the process for learning in traditional neural networks 100 involves random input value convergence.

In general, neural networks receive information, which will be processed by the network of neurons through what is known as training sessions. During these training sessions, the network processes or "solves" the problem or detects the patterns. Once learning is complete the network may be used to predict outputs based upon a given set of inputs.

For example, a set of inputs 105 could represent a city and its employment levels. In one example, the network 100 may be designed to find geographic trends in economic data (i.e., the n). In this example, the output 115 may be a set of geographical regions and a number representing the network's 100 prediction for economic success for that city in the corresponding geographical region. It should be appreciated that this is a very simple example and actual machine learning networks 100 are commonly more complex.

The described systems and methods do not use the weights and thresholds system used in traditional neural networks (as discussed above), that is, a simple system of weights and aggregation. The described systems and methods, instead, achieve improved efficiency by embedding more decision making systems into each neuron, which reduces both the number of neurons required to solve a problem and the amount of learning required to solve a problem.

Figure 3:
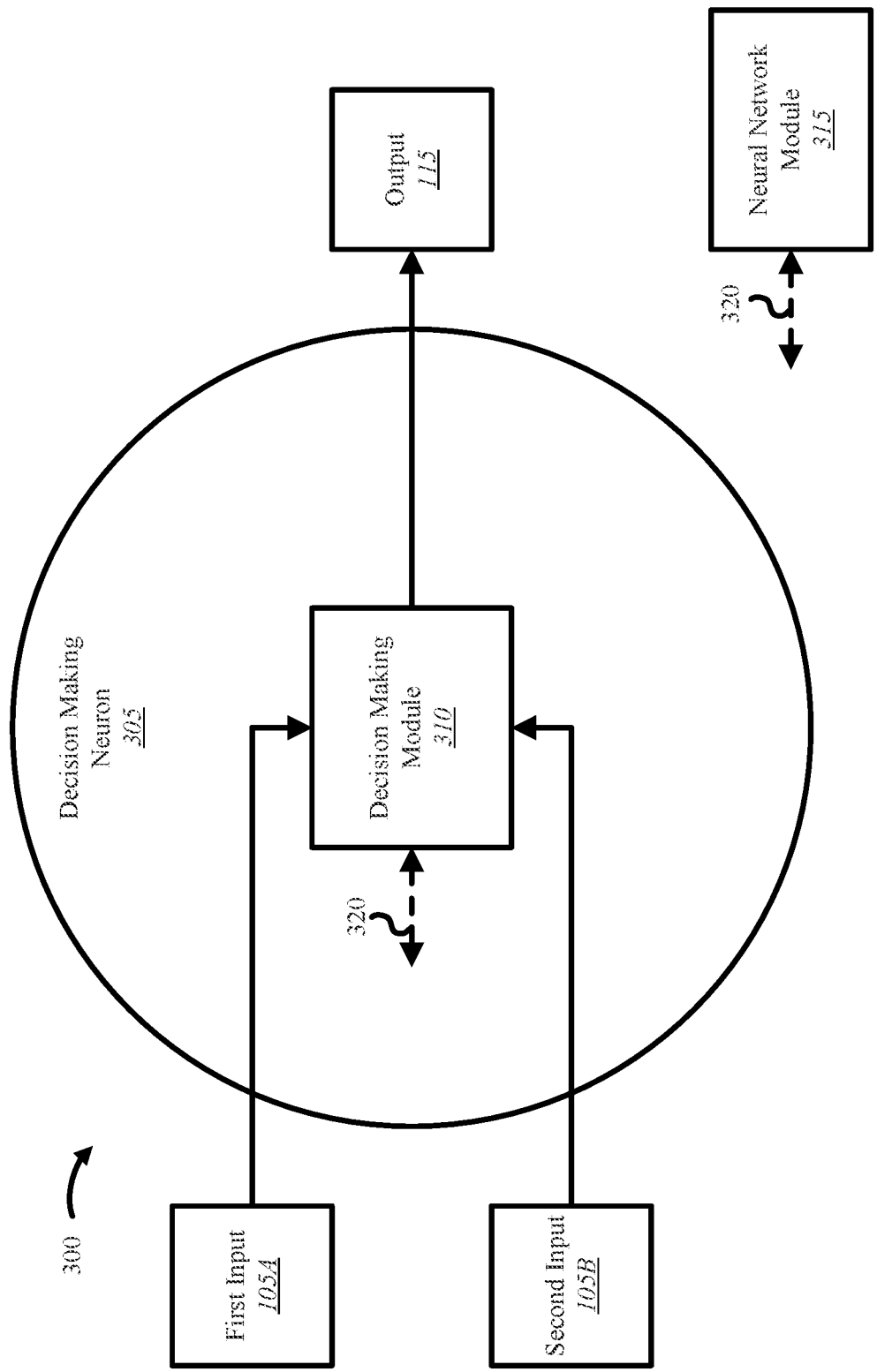
FIG. 3 is a block diagram illustrating one example of a decision making neuron in accordance with the described systems and methods.

FIG. 3 is a block diagram illustrating one example 300 of a decision making neuron 305 in accordance with the described systems and methods. As illustrated, the decision making neuron 305 includes a first input 105A and a second input 105B which are passed directly into a decision making module 310 (without any weighting or thresholding, for example). Although only two inputs are shown, it is understood that more or less may be used without departing from the scope of the present systems and methods.

The decision making module 310 makes a decision which is output to an output 115. In one example, the decision making module 310 makes a decision based on the received inputs 105 (e.g., inputs 105A, 105B). In another example, the decision making module 310 may make a decision that does not consider the received inputs 105. For instance, the decision making module 310 may make a completely random decision, a decision based on one or more previously made decisions, a decision based on one or more previously made decisions made by one or more other decision making neurons 305, a decision based on an algorithm (e.g., learned algorithm), etc., or any combination of the above. For instance, the decision making module 310 may make a random decision based on a best known previous decision (by the decision making neuron 305 and/or another decision making neuron 305, for example).

The decision making module 310 may have a connection 320 to a neural network module 315 and/or one or more other decision making neurons 305 (i.e., decision making modules 310) within the neural network. Thus, the decision making module 310 can make decisions independently, based on the collective information obtained by other decision making neurons 305, and/or in coordination with the neural network (e.g., other decision making neurons 305) as a system.

The neural network module 315 may provide system (e.g., network) level management, coordination, and/or control of a plurality of decision making neurons 305. The neural network module 315 may identify data types of inputs and may pair unique input value combinations together. In one example, the neural network module 315 may pair input values together so that every possible input value combination is represented. In some embodiments, the neural network module 315 may wait to create (e.g., instantiate) a decision making neuron 305 until the specific input value pair associated with a possible decision making neuron 305 is received. This may allow for more efficient memory usage. For example, if a problem is solved without considering every possible input value combination. The neural network module 315 may manage system level parameters including whether inputs are linear or distinct, the tolerance of linearity between inputs, a number of total number of cycles, and/or any global outputs.

Figure 4:
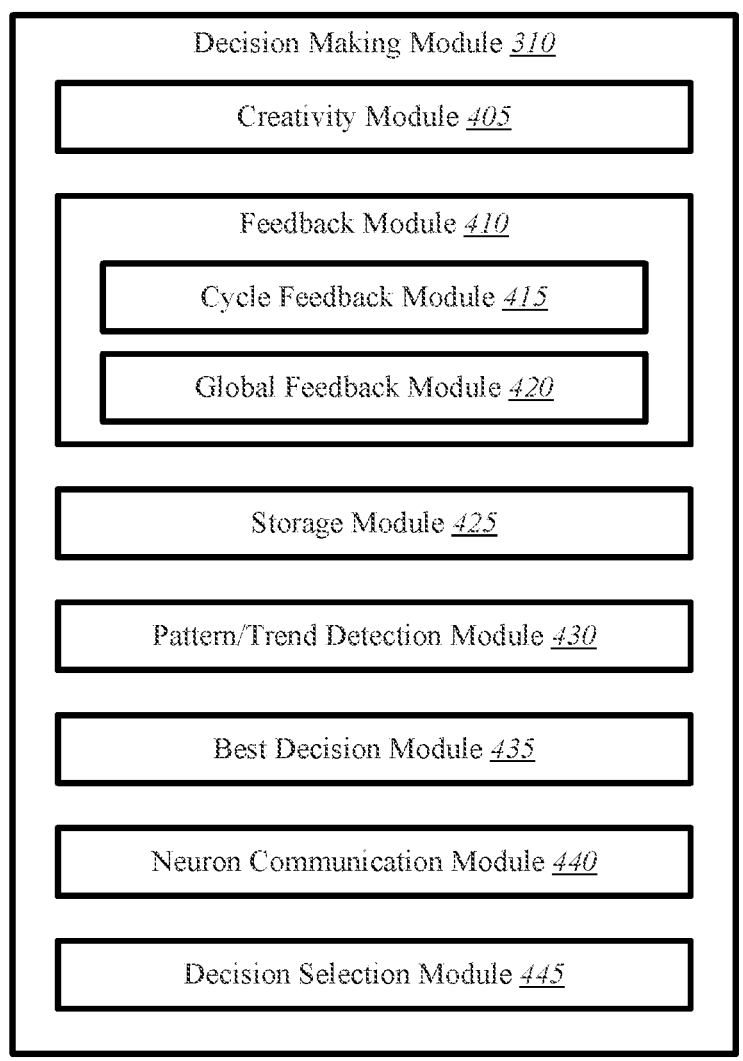
FIG. 4 is a block diagram illustrating one example of a decision making module.

FIG. 4 is a block diagram illustrating one example 400 of a decision making module 310. The decision making module 310 may be an example of the decision making module 310 illustrated in FIG. 3. The decision making module 310 includes a creativity module 405, a feedback module 410, a storage module 425, a pattern/trend detection module 430, a best decision module 435, a neuron communication module 440, and a decision selection module 445.

The creativity module 405 may use randomness to add creativity to the decision making. In one example, the creativity module 405 may generate a completely random decision (regardless of the inputs, for example). In another example, the creativity module 405 may add randomness to a best known decision to see if a better decision can be realized. The amount of creativity that is incorporated into the decision making may be based on a randomness value. The randomness value may be managed locally at the decision making module 310 and/or managed for the network as a system by the neural network module 315. The randomness factor may decrease from one cycle to another cycle so that a training process can move from creative possibilities to a solution. In some cases, the randomness factor may increase at times to determine if a decision or result can be improved by creatively considering some additional options.

The feedback module 410 provides feedback to the decision making module 310 for smart decision making. This feedback enables the decision making module 310 to learn from its experiences. That is learn what decisions are more successful or less successful for obtaining a desired solution. The feedback module 410 may include a cycle feedback module 415 and a global feedback module 420.

The cycle feedback module 415 provides feedback on the output 115 that was generated from the decision making module 310. This includes the output 115 of the decision itself as well as any other meta data associated with the output 115. For example, where the output was provided to (e.g., another decision making neuron or a final output) and the results of any subsequent processing.

The global feedback module 420 may provide global outputs (e.g., an output of one or more decision making neurons over the course of one or more cycles). In one example, the global output represents the attempted solution to the problem. Accordingly, the global output may be used to determine if a decision contributed to or detracted from a particular global output. In one example, the global feedback module 420 may obtain the global output from the neural network module 315. In some cases, a pre-populated known solutions may be used as an alternative to using feedback.

This arrangement is often referred to as supervised learning. In unsupervised learning arrangements, feedback (e.g., global feedback is used).

The storage module 425 may store the inputs, the decision, and/or any feedback associated with the decision (e.g., the cycle output, any global output, and any metadata). This data may be stored so that it is accessible to the decision making module 310 to aid in future decision making. In particular, this feedback and storage aspect enables the decision making module 310 to make smart decisions because it can use what it has learned from any or all of the previous cycles to aid in the decision making in the current cycle.

The pattern/trend detection module 430 may identify patterns and/or trends based on decisions and any feedback from those decisions. Examples of trends include critical data points, desirable results, etc. In one example, the global output feedback may be used to identify a trend of decisions and their resulting outputs that lead to desirable outputs (e.g., desirable global outputs). In another example, differing cycle outcomes based on similar decisions may be used to identify a critical data point (e.g., a data point that results in different outcomes based on what side of the data point an output (e.g., cycle output) is). In some cases, the pattern/trend detection module may identify trends based on decisions and/or feedback from other (e.g., linear related) decision making neurons. It is understood that patterns and trends may be identified based on a variety of factors, including simply based on resulting cycle output values from previously made decisions. It is appreciated that the creativity module 405 may aid in providing creativity testing results that facilitate the determination of patterns and trends.

The best decision module 435 may determine a best decision based on a plurality of decisions and the resulting feedback from those decisions. In some cases, the best decision may be determined based on patterns or trends detected/identified by the pattern/trend detection module 430. The best decision may be determined based on decisions and the resulting feedback of just the decision making module 310 or based on the decisions and resulting feedback of other decision making neurons 305 and or the system (e.g., network) as a whole.

The neuron communication module 440 may allow for decisions and the resulting feedback of other decision making neurons 305 and/or parameters and network level parameters and metadata to be accessed by the decision making module 310. As noted above, this information may be used to improve the speed and efficiency associated with the learning process.

The decision selection module 445 may make a decision based on any (or all) of the information accessible to the decision making module 310 (as provided by/through the various modules discussed above, for example). Thus, the decision that is selected for use by the decision making module 310 may be completely random, partially random, based on only local results, based on only results from other decision making neurons 305, based on a combination of results from both the decision making neuron 305 and other decision making neurons 305, based on determined trends and/or patterns, and/or any combination of the above. This flexibility in decision making allows the creativity and/or number of cycles be tailored to the unique specifications of the problem being solved.

Figure 5:
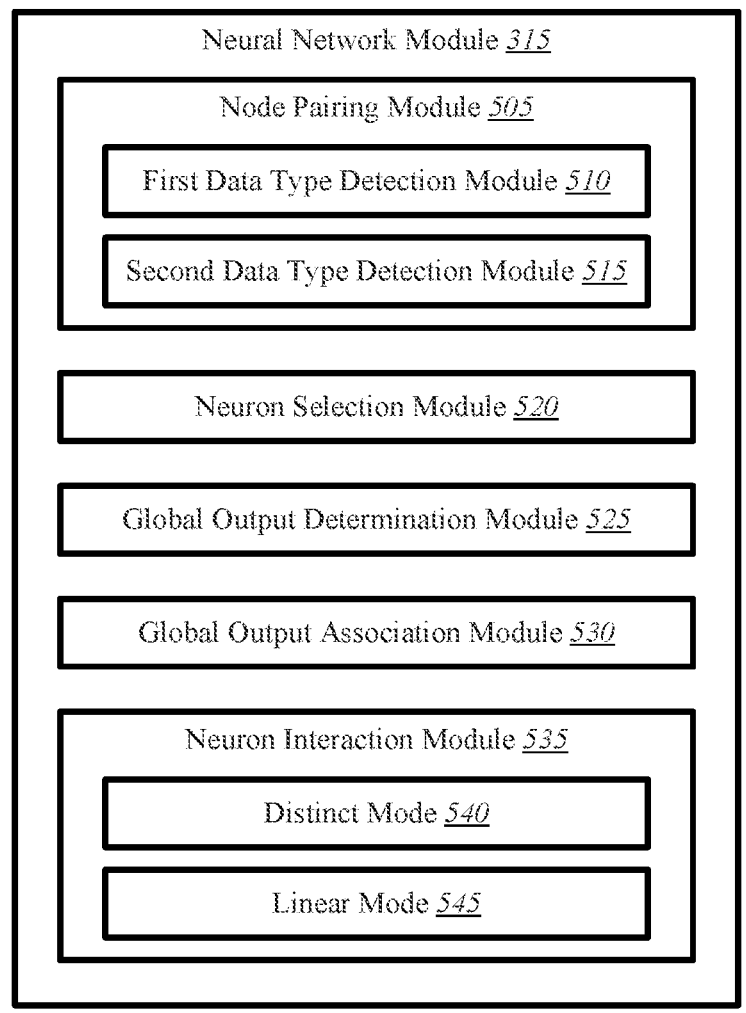
FIG. 5 is a block diagram of an example of a neural network module.

FIG. 5 is a block diagram of an example 500 of a neural network module 315. The neural network module 315 may be one example of the neural network module 315 illustrated with respect to FIG. 3. The neural network module 315 includes a node pairing module 505, a neuron selection module 520, a global output determination module 525, a global output association module 530, and a neuron interaction module 535.

Figure 6:
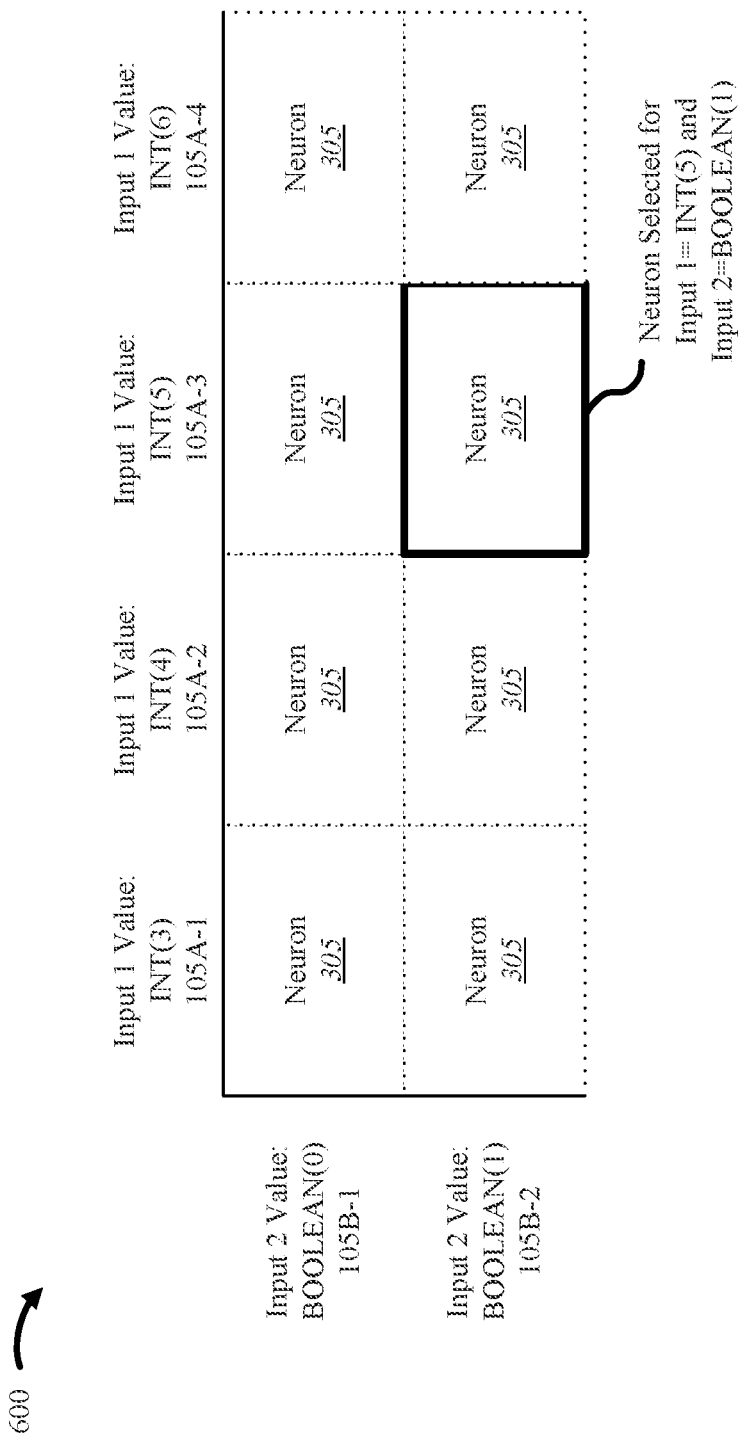
FIG. 6 is a block diagram illustrating one example of a network of decision making neurons that are each associated with a unique input value combination where each input value combination is distinct.

The node pairing module 505 may determine a finite number of possible input values for each input. For example, a Boolean input has two possible input values (e.g., 0 and 1) whereas an integer between 3 and 6 has four possible input values (e.g., 3, 4, 5, and 6). In one embodiment, the pairing may be represented as a 2×4 matrix (representing eight unique combinations/pairings of the inputs) with the respective Boolean values representing the rows of the matrix and the respective integer values representing the columns of the matrix. Each pairing (e.g., each row/column combination) may be associated with a potential decision making neuron 305. An example matrix, illustrating this example, is illustrated in FIG. 6.

The node pairing module 505 includes a first data type detection module 510 and a second data type detection module 515. While only two data type detection modules are shown, it is understood that more or less detection modules may be used depending on the number of inputs to the problem to be solved. Regardless of the number of inputs, the data type detection modules may determine the data type of each input and the associated finite possible values associated with that identified data type (as discussed above). This pairing of unique input value combinations with unique decision making neurons 305 allows the decision making of each decision making neuron 305 to be uniquely tailored to the unique combination of input values. The result of this pairing enables for both faster learning and a faster learning process.

The neuron selection module 520 determines a received input value combination and selects the particular decision making neuron that is associated with that specific pairing (e.g., input value combination). In some cases, a problem may be solved without considering every possible input value combination. Accordingly, in one embodiment, an actual decision making neuron 305 may not be created (e.g., instantiated, powered on) until that potential decision making neuron is selected (an input value combination associated with that (potential) decision making neuron 305 has been obtained).

The global output determination module 525 may determine a global output associated with the neural network. In one example, a global output may be the result of one or more cycles performed by one or more decision making neurons 305. For instance, a given input combination may result in a selection of decision making neurons 305, each performing a cycle that combine to form a global output (e.g., a global score associated with the problem, for example).

The global output association module 530 may provide the global output to one or more of the decision making neurons 305. For example, the global output association module 530 may provide the global output to each decision making neuron 305 that made decisions that contributed to the global output. In one example, the global output association module 530 may associate the global output with a particular decision and/or resulting cycle output of a decision making neuron that participated in a global output.

The neuron interaction module 535 may determine whether an input is related (e.g., linearly related) to another input and allow for different levels of interaction based on the relationship. In one example, inputs are distinct and the neuron interaction module 535 configures the distinct decision making neurons to operate in a distinct mode 540. In the distinct mode, the decision making neurons operate independently from each other. That is, they do not consider other decision making neuron's decisions when making a decision. In another example, inputs are related such that there is a relationship between decisions and resulting cycle outputs made by one or more other decision making neurons 305 and the decisions and resulting cycle outputs of another decision making neuron 305. In the case of related inputs, the neuron interaction module 535 configures the related decision making neurons to operate in a linear mode 545. That is, they consider other decision making neuron's decisions when making a decision. The selection of distinct mode 540 or linear mode 545 is input specific and therefore is determined individually for each decision making neuron 305 based on the input values that are provided to that decision making neuron 305.

It is should be noted that during training, neural networks may at times make decisions completely randomly. This randomness allows the network to attempt a greater variety of solutions and is used in some forms of training. Note that the processes discussed herein are referring to times when the decision making neurons 305 are responsible for generating outputs and not the times when random values are generated. In some embodiments, during this random mode, the decision making neuron's 305 operations are bypassed completely and the output 115 may be generated completely randomly (regardless of the inputs, for example).

Thus, a decision making neuron 305 processes inputs in a completely different way than traditional neurons 110. Instead of using simple weights, the decision making neurons 305 use large amounts of data to arrive at a "best" decision for an output 115. This includes all data from previous events. So every input, output, decision, feedback, and other historical data can be accessed to recall which previous decisions had positive or negative feedback. This includes decisions made by other decision making neurons in the network where a relationship exists such that a decision made with similar inputs may have a similar result. Decisions may also be made based upon previously identified patterns (e.g., patterns that the network has already identified, stored, and for which known outputs have been identified. In addition, decisions may take into consideration metadata associated with the inputs 105, explained more below. Other information may be taken into consideration during the decision process as well (e.g., user settings, user inputted patterns or any other known data).

The decision making module 310 has access to a wide range of data and can be programmed to make a very accurate decision. Since the present systems and methods have the benefit of a vast array of data, including previous decisions and their results, it is able to generate a more refined output value. This more refined value results in more accurate results and allows for more timely results using fewer neurons (e.g., decision making neurons 305).

Metadata may include different information to give the network hints that allow it to process a problem faster. One example is the use of strongly defined input value parameters. In traditional neural networks 100 the inputs 105 are typically double floating point values. A double floating point value can typically range from −10308 through +10308 (according to Institute of Electrical and Electronics Engineers (IEEE) 754) including decimal values in-between such as 0.123456. This wide range of values is what makes the weights and thresholds system discussed above capable of solving complex problems. However, this wide range of values comes at a processing cost. The present systems and methods allow metadata to contain strongly defined input value parameters. For example, if it is known that a first input 105A is a the red value of an RGB color, then the decision making module 310 can consider that only 0 through 254 are possible values for this first input 105A. Further, based on this information, the decision making module 310 knows that this first input value has a close relationship to the green and blue values for the same color. The decision making module 310 can make more accurate decisions based upon this knowledge.

Another example of metadata is the use of text hints. With text hints meta data, the decision making module 310 may use historical data to correlate a particular learning session (e.g., a collection of cycles that results in a global output (i.e., session output)) with associated metadata. For example, if a network of decision making neurons 305 is being used to read pixels from a picture to find objects, the caption of that picture could be leveraged as text meta data. Although the caption may not be relevant, the decision making module 310 may be made more efficient by looking for overlapping text in similar items (e.g., the word "dog" being present in the metadata could make it more likely that the decision making module 310 will provide an output 115 associated with dogs.

FIG. 6 and FIG. 7 illustrate examples of the interaction between neurons depending on whether inputs are linear or distinct. FIG. 6 and FIG. 7 additionally illustrate different examples of how unique combinations of input values may be paired and associated with a unique (possible) decision making neuron 305.

As discussed above, an input 115 may be defined (e.g., predefined) as being distinct or linear. For example, a social security number is distinct. That is, the decision making module 310 should not make decisions based upon similar social security number inputs. However, a location might be linear and the decision making module 310 should consider the decisions and resulting cycle outputs associated with the related inputs. For example, if one input is being used to identify a person by social security number and another pair of inputs is being used to define a location of on an X, Y coordinate plane, the decision making module 310 should make different decisions for the X and Y, which are related, than it should for the social security number, which is distinct.

Historical data can additionally be used to improve the decision making process of the decision making module 310. When using historical data, the decision making module 310 may try to find historical data that is relevant, even when the input values in the historical data are not an exact match to the values coming from the inputs 105. In the above example, marking inputs as distinct or linear allows the decision making module 310 to include similar inputs for X and Y values while ignoring similar inputs from social security number values. This reduces processing time and increases accuracy for the neural network. In some embodiments, the network of decision making neurons 305 can support an infinite number of metadata information parameters, so long as each parameter is considered in the logic in the decision making process.

FIG. 6 is a block diagram illustrating one example of a network of decision making neurons 305 that are each associated with a unique input value combination where each input value combination is distinct. As discussed above, a first data type may be an integer between the values of 3 and 6 and a second data type may be Boolean. This results in eight unique input value combinations as shown, where each unique input value combination is associated with a particular decision making neuron 305. For instance, if an integer 5 is received as a first input value and a Boolean 1 is received as a second input value, then the boxed neuron would be selected to generate a decision and a result output. Since the inputs are distinct, the selected (boxed) neuron would utilize its own decision making history and available data that is applicable to the decision making neuron to determine a decision to make.

FIG. 7 is a block diagram illustrating another example of a network of decision making neurons 305 that are each associated with a unique input value combination and some of the input value combinations are linear while others are distinct. In this example, the first data type is an integer between the values of 3 and 6 and the second data type is an integer between the values of 9 and 12. This results in a 4×4 matrix as illustrated. In this example, the decision making neurons 305 in the three most right columns are linearly related while the decision making neurons in the first column are distinct. If a first input value is integer 4 and a second input value is integer 12 and there is 1% linear bracketing tolerance then the selected decision making neuron 305 (row 4, column 2) may consider the decisions and/or results of any or all of the boxed decision making neurons that satisfy that tolerance (e.g., a tolerance of 1%).

In one example, tolerances start out larger or are increased when finer tolerance are not producing better results. In some cases, tolerances are larger in the beginning so as to use using anything similar while the data set is small (e.g., when the testing is getting underway), then refine the accuracy by using a more precise tolerance as the testing progresses. In some cases, the decision making neuron 310 may in a predetermined or automatic way, back off the tolerance if the results get worse not better. One example of the use of tolerances is illustrated in the case of looking for the trajectory to launch a golf ball towards a hole. In this example, the testing starts out random and a data set is built with the results of the purely random data. In this early phase of testing a large tolerance is needed to start so that something 10 feet past the hole and 10 feet before the hole are considered similar while a trajectory 250 feet past the hole is not considered similar. However, to eventually get the ball into the hole, the tolerance is made to be finer with time to narrow in on the hole. It is understood, that the fineness of the tolerance is limited by the amount of data. If there is enough data to support the finer tolerance, than the tolerance can be reduced. But if there is not enough data to support the tolerance, than the tolerance will need to be increased until there is enough data to support the finer tolerance.

It is noted that any combination of metadata values can be mixed within the neural network system of decision making neurons 305. For example, metadata types of linear, distinct, geolocation, video, picture, etc. could all be mixed in a system. The metadata allows the neural network to learn faster by understanding what type of data is being processed. While systems that do not use metadata can still find patterns, a machine learning system that is designed with processing support for various metadata may process such data more quickly and with more accuracy.

Thus the decision making module 310 and the neural network module 315 are able to process values differently depending on their metadata. In the example illustrated in FIG. 6, the decision making neurons 305 involve distinct values and the adjacent decision making neurons 305 would not be relevant in decision making. In contrast, in the example illustrated in FIG. 7, some of the inputs are linearly correlated and a range of related decision making neurons 305 may be selected. In this example, a selected decision making neuron 305 may use information from the entire selected set of neurons to make a decision (based on a bracketing tolerance, for example).

As can be appreciated in the foregoing description neural network layout of the present systems and methods has a fixed number of decision making neurons 305. It is a fixed number because the present systems and methods use an assigned set of neurons to input value combinations. This results in an organized matrix of decision making neurons 305 with each possible combination of input values being assigned to a single decision making neuron 305. This fixed number of neurons is almost always less than the traditional network's number of neurons. This reduction in number of needed neurons further adds to the efficiency associated with the present systems and methods. This is because using extra neurons takes additional time. This is particularly relevant in the context of traditional neural networks where all neurons must randomly converge on an input set.

Figure 8:
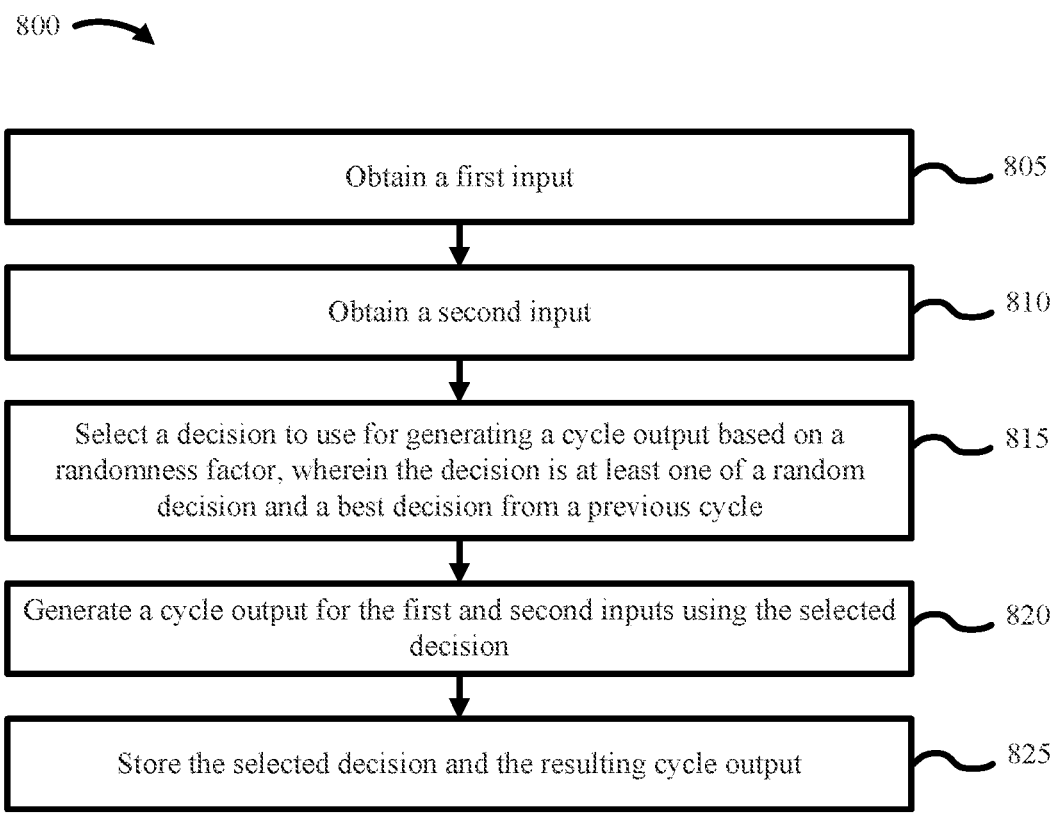
FIG. 8 is a flow diagram of a method for machine learning.

FIG. 8 is a flow diagram of a method 800 for machine learning. The method 800 is performed by the decision making neuron 305 and more specifically, the decision making module 310 illustrated in FIGS. 3 and 4. Although the operations of method 800 are illustrated as being performed in a particular order, it is understood that the operations of method 800 may be reordered without departing from the scope of the method.

At 805, a first input is obtained. At 810, a second input is obtained. These first and second inputs may be specific input values (based on the specific values associated with the particular data type). At 815, a decision for generating a cycle output is selected based on a randomness factor. The decision is one of a random decision or a best decision based on a previous cycle. At 820 a cycle output is generated for the first and second inputs using the selected decision. In some cases (e.g., in the case of a complete random decision), the decision may be completely unrelated to the input values. At 825, the selected decision and the resulting cycle output are stored. In addition, any other metadata, historical data, and/or beneficial information may be stored.

The operations of method 800 may be performed by an application specific processor, programmable application specific integrated circuit (ASIC), field programmable gate array (FPGA), or the like.

Figure 9:
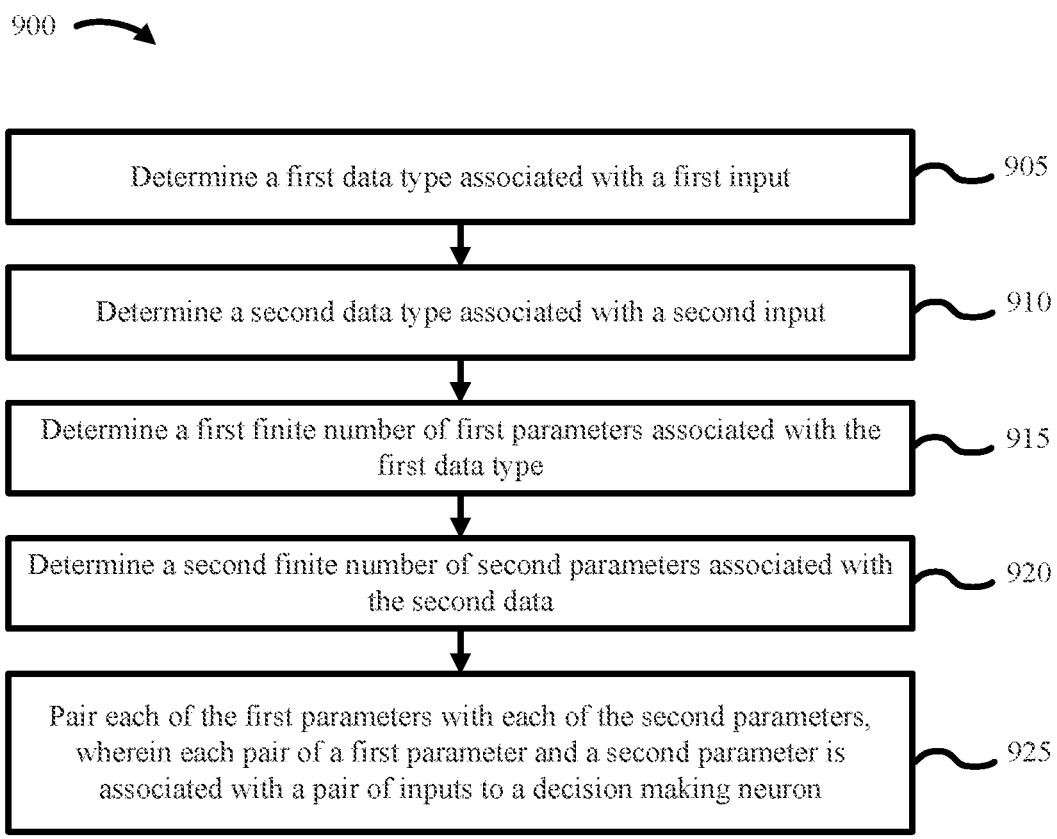
FIG. 9 is a flow diagram of a method for machine learning.

FIG. 9 is a flow diagram of a method 900 for machine learning. The method 900 is performed by the neural network module 315 illustrated in FIGS. 3 and 5. Although the operations of method 900 are illustrated as being performed in a particular order, it is understood that the operations of method 900 may be reordered without departing from the scope of the method.

At 905, a first data associated with a first input is determined. At 910, a second data type associated with a second input is determined. At 915, a first finite number of first parameters associated with the first data type are determined. These first parameters may be the specific finite values associated with the data type (e.g., the specific values for a binary data type (e.g., 0 and 1)). At 920, a second finite number of second parameters associated with the second data type are determined. At 925, each of the first parameters is paired with each of the second parameters. Each pair of a first parameter and a second parameter is associated with a pair of inputs to a decision making neuron.

The operations of method 900 may be performed by an application specific processor, programmable application specific integrated circuit (ASIC), field programmable gate array (FPGA), or the like.

Figure 10:
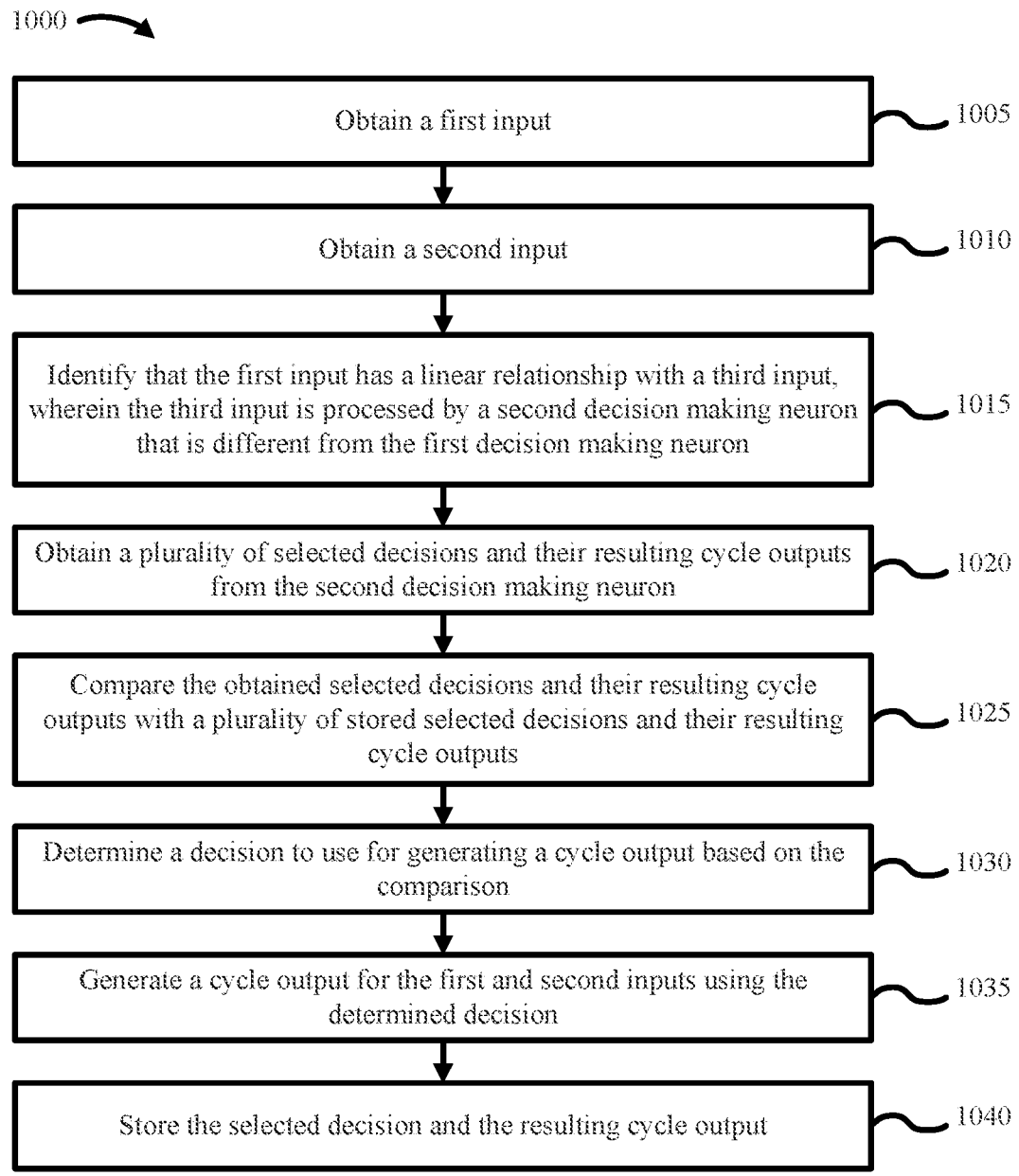
FIG. 10 is a flow diagram of a method for machine learning.

FIG. 10 is a flow diagram of a method 1000 for machine learning. The method 1000 is performed by the decision making neuron 305 and more specifically, the decision making module 310 illustrated in FIGS. 3 and 4. Although the operations of method 1000 are illustrated as being performed in a particular order, it is understood that the operations of method 1000 may be reordered without departing from the scope of the method.

At 1005, a first input is obtained. At 1010, a second input is obtained. These first and second inputs may be specific input values (based on the specific values associated with the particular data type). At 1015, the first input is identified as having a linear relationship with a third input. The third input is processed by a second decision making neuron that is different than the first decision making neuron. At 1020, a plurality of selected decisions and their resulting cycle outputs are obtained from the second decision making neuron. At 1025, the obtained selected decisions and their resulting cycle outputs are compared with a plurality of stored selected decisions and their resulting cycle outputs. At 1030, a decision to use for generating a cycle output is determined based on the comparison. At 1035, a cycle output for the first and second inputs is generated using the determined decision. At 1040, the selected decision and the resulting cycle output are stored.

The operations of method 1000 may be performed by an application specific processor, programmable application specific integrated circuit (ASIC), field programmable gate array (FPGA), or the like.

Figure 11:
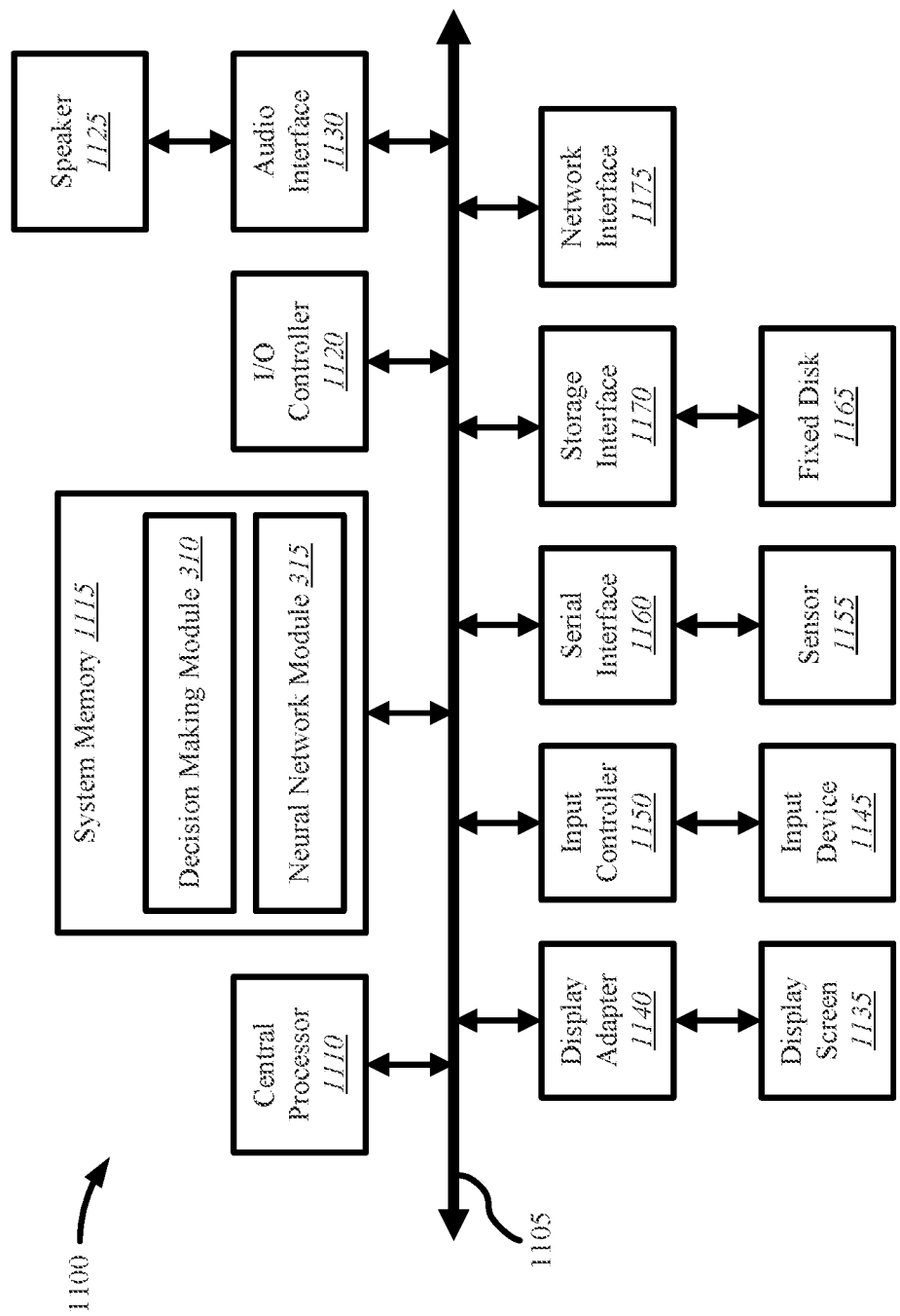
FIG. 11 depicts a block diagram of a computer system suitable for implementing the present systems and methods.

FIG. 11 depicts a block diagram of a computer system 1100 suitable for implementing the present systems and methods. Computer system 1100 includes a bus 1105 which interconnects major subsystems of computer system 1100, such as a central processor 1110, a system memory 1115 (typically RAM, but which may also include ROM, flash RAM, or the like), an input/output (I/O) controller 1120, an external audio device, such as a speaker system 1125 via an audio output interface 1130, an external device, such as a display screen 1135 via display adapter 1140, an input device 1145 (e.g., keyboard, touchpad, touch screen, voice recognition module, etc.) (interfaced with an input controller 1150), an input device 1155 via a serial interface 1160, a fixed disk (or other storage medium, for example) 1165 via a storage interface 1170, and a network interface 1175 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the decision making neuron 305 (not shown), the decision making module 310, and the neural network module 315 to implement the present systems and methods may be stored within the system memory 1115. Applications resident with computer system 1100 are generally stored on and accessed via a non-transitory computer readable medium, such as a hard disk drive (e.g., fixed disk 1165) or other storage medium.

Storage interface 1170, as with the other storage interfaces of computer system 1100, can connect to a standard computer readable medium for storage and/or retrieval of information, such as a fixed disk drive (e.g., fixed disk 1165). Fixed disk drive may be a part of computer system 1100 or may be separate and accessed through other interface systems. Network interface 1175 may provide a direct connection to a remote server via a direct network link to the Internet. Network interface 1175 may provide such connection using wireless techniques, including digital cellular telephone connection, Cellular Digital Packet Data (CDPD) connection, digital satellite data connection, or the like.

Many other devices or subsystems (not shown) may be connected in a similar manner. Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in a non-transitory computer-readable medium such as one or more of system memory 1115 or fixed disk 1175. The operating system provided on computer system 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal whether due to circuit limitations or due to passage through other circuit elements which do not change the informational and/or final functional aspect of the first signal.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data.

One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A method for machine learning performed by a processor that executes instructions stored in a non-transitory computer-readable medium, the method comprising:
obtaining a set of inputs;
searching a database for a node uniquely associated with the set of inputs;
if a node uniquely associated with the set of inputs is not found in the database:
creating the node in the database;
associating the node with the set of inputs;
randomly generating a decision set using a random number generator;
receiving a score evaluating the decision set at solving a problem; and
storing, in association with the node, the decision set with the score for the decision set; and
if the node associated with the set of inputs is found in the database:
retrieving a decision set associated with the node with a best previous score;
if a randomness factor is zero, outputting the decision set with the best previous score as a solution to the problem; and
if the randomness factor is non-zero:
generating a new decision set, wherein each member of the new decision set is either the same as the retrieved decision set or is randomized by the random number generator, wherein a chance of a member of the new decision set being randomized is determined by the randomness factor;
receiving a score evaluating the new decision set at solving the problem; and
storing, in association with the node, the new decision set and the score for the new decision set;
wherein each node associates a unique set of inputs with at least one decision set and corresponding score.

2. The method of claim 1, wherein the randomness factor at least one of increases and decreases from a first cycle to a second cycle based on at least one of a predetermined number of cycles and a threshold.

3. The method of claim 1, further comprising:
determining a best decision set for the node based on a plurality of decision sets produced by one or more other nodes.

4. The method of claim 3, wherein the input set for a first node comprises a first input and a second input, and wherein determining the best decision set for the first node comprises:
determining that the first input has a linear relationship with a third input, wherein the third input is associated with a second node;
obtaining a plurality of decision sets and associated scores from the second node;
comparing the plurality of decision sets and associated scores obtained from the second node with a plurality of stored decision sets and associated scores; and
identifying a best decision set based on the the associated scores.

5. The method of claim 3, wherein determining the best decision set for the node comprises:
identifying a critical data point based on the plurality of decision sets and associated scores; and
determining the best decision set based on the identified critical data point.

6. The method of claim 3, wherein determining the best decision set for the node comprises:

obtaining a plurality of global outputs, wherein a global output is based on at least one output set from at least one node;

identifying a trend between a plurality of stored decision sets for the node and the plurality of global outputs, wherein the trend relates stored decision sets with desirable global outputs according to a set of criteria; and determining the best decision set for the node based on the identified trend.

7. The method of claim 6, wherein determining the best decision set based on the identified trend comprises:

identifying a stored decision set where the associated score leads the trend, wherein the identified decision set is designated as the best decision set.

8. The method of claim 6, further comprising:

associating each global output of the plurality of global outputs with its corresponding stored decision set.

9. The method of claim 1, wherein at least one randomized member of the new decision set is based at least in part on a previous best decision set.

10. The method of claim 1, wherein the input set comprise a first input and a second input, the method including the initial steps of:

identifying a first data type for the first input;
identifying a second data type for the second input; and
defining a third data type for the decision set based on the identified first data type and the identified second data type.

11. The method of claim 10, wherein the first data type, second data type, and third data type are each selected from the group consisting of: Boolean, integer, double, picture, geolocation, and user-defined data type; and wherein the selected data type is within a defined range.

12. An apparatus for machine learning, comprising:
a processor; and
a memory in electronic communication with the processor the memory storing instructions that are executable by the processor to:
obtain a set of inputs;
search a database for a node uniquely associated with the set of inputs;
if a node uniquely associated with the set of inputs is not found in the database:
create the node in the database;
associate the node with the set of inputs;
randomly generate a decision set using a random number generator;
receive a score evaluating the decision set at solving a problem; and
store, in association with the node, the decision set with the score for the decision set; and
if the node uniquely associated with the set of inputs is found in the database:
retrieve a decision set associated with the node with a best previous score;
if a randomness factor is zero, output the decision set with the best previous score as a best solution to the problem;
if the randomness factor is non-zero:
generate a new decision set, wherein each member of the new decision set is either the same as the retrieved decision set or is randomized using the random number generator, wherein a chance of a member of the new decision set being randomized is determined by the randomness factor;
receive a score evaluating the new decision set at solving the problem; and
store, in association with the node, the new decision set and the score for the new decision set;
wherein each node associates a unique set of inputs with at least one decision set and corresponding score.

13. The apparatus of claim 12, wherein the randomness factor at least one of increases and decreases from a first cycle to a second cycle based on a predetermined number of cycles and a threshold.

14. The apparatus of claim 12, wherein the instructions are further executable by the processor to:
determine a best decision set for the node based on a plurality of decision sets produced by one or more other nodes.

15. The apparatus of claim 14, wherein the input set for a first node comprises a first input and a second input, and wherein the instructions to determine the best decision set for the first node comprise instructions executable by the processor to:
determine that the first input has a linear relationship with a third input, wherein the third input is associated with a second node;
obtain a plurality of decision sets and associated scores from the second node;
compare the plurality of decision sets with a plurality of stored decision sets and associated scores; and
identify a best decision set based on the associated scores.

16. The apparatus of claim 14, wherein the instructions to determine the best decision set for the node comprise instructions executable by the processor to:
identify a critical data point based on the plurality of decision sets and associated scores; and
determine the best decision set based on the identified critical data point.

17. The apparatus of claim 14, wherein the instructions to determine the best decision set for the node comprise instructions executable by the processor to:
obtain a plurality of global outputs, wherein a global output is based on at least one output set from at least one node;
identify a trend between a plurality of stored decision sets for the node and the plurality of global outputs, wherein the trend relates stored decision sets with desirable global outputs according to a set of criteria; and
determine the best decision set for the node based on the identified trend.

18. The apparatus of claim 17, wherein the instructions to determine the best decision based on the identified trend comprise instructions executable by the processor to:
identify a stored decision set where the associated score leads the trend, wherein the identified decision set is designated as the best decision set.

19. The apparatus of claim 17, wherein the instructions are further executable by the processor to:
associate each global output of the plurality of global outputs with its corresponding stored decision set.

20. The apparatus of claim 12, wherein at least one randomized member of the new decision set is based at least in part on a previous best decision set.

21. The apparatus of claim 12, wherein the instructions are further executable by the processor to:
identify a first data type for the first input;
identify a second data type for the second input; and define a third data type for the decision set based on the identified first data type and the identified second data type.

\* \* \* \* \*